United States Patent [19]
Anderson

[11] Patent Number: 5,890,394
[45] Date of Patent: Apr. 6, 1999

[54] HOLLOW STEERING GEAR RACK WITH INTEGRAL AIR GROOVES

[75] Inventor: Tamera Jean Anderson, Ann Arbor, Mich.

[73] Assignee: Ford Motor Company, Dearborn, Mich.

[21] Appl. No.: 745,234

[22] Filed: Nov. 8, 1996

[51] Int. Cl.$^6$ .................................................. F16H 1/04
[52] U.S. Cl. ............................ 74/422; 74/498; 180/428; 280/96
[58] Field of Search ........................... 74/422, 498, 18.2; 180/400, 428; 280/96

[56] References Cited

U.S. PATENT DOCUMENTS

| | | |
|---|---|---|
| 892,972 | 7/1908 | Bryce . |
| 2,244,939 | 6/1941 | Carlson . |
| 2,260,500 | 5/1941 | Wylie . |
| 2,779,564 | 1/1957 | Press ........................................ 251/257 |
| 3,505,898 | 4/1970 | Bradshaw ................................. 74/498 |
| 3,623,379 | 11/1971 | Bradshaw et al. ....................... 74/498 |
| 3,951,045 | 4/1976 | Frei et al. . |
| 4,133,221 | 1/1979 | Clary ........................................ 74/498 |
| 4,522,419 | 6/1985 | Yoshida et al. ........................... 280/96 |
| 4,573,399 | 3/1986 | Wilson . |
| 4,646,868 | 3/1987 | Rosell ...................................... 180/148 |
| 4,721,175 | 1/1988 | Butler ...................................... 74/498 X |
| 4,830,559 | 5/1989 | O'Herron . |
| 4,986,382 | 1/1991 | Harrison ................................ 74/422 X |
| 5,069,080 | 12/1991 | Simon ...................................... 74/422 |
| 5,499,550 | 3/1996 | Westphal et al. ......................... 74/422 |

FOREIGN PATENT DOCUMENTS

| | | |
|---|---|---|
| 1168537 | 12/1958 | France . |
| 2513203 | 3/1983 | France . |
| 1075959 | 2/1960 | Germany . |
| 601489 | 1/1959 | Italy . |
| 57-198168 | 12/1982 | Japan . |
| 62-99261 | 5/1987 | Japan . |
| 124361 | 11/1990 | Japan . |
| 619605 | 3/1949 | United Kingdom . |

*Primary Examiner*—Charles A. Marmor
*Assistant Examiner*—David Fenstermacher
*Attorney, Agent, or Firm*—Roger L. May; Raymond L. Coppiellie; Gregory P. Brown

[57] ABSTRACT

A steering gear rack (14) for a steering system (12) of a vehicle (10) is positioned in a housing (52) with its end portions (24, 26) protruding from the housing (52) to be connected by ball joints (32) and tie rods (16) to the front wheels of the vehicle (10). The hollow steering gear rack shaft (20) defines an air passageway (22) that extends between the end portions (24, 26). Each of the end portions (24, 26) has an end face (30) and internal threads (28) on the end portion (24) extending inward from the end face (30), and a longitudinal groove (34) extending inward from the end face (30) through and past the internal threads (28) and radially outward past the internal threads (28) extending the air passageway (22) to the end face (30). The end portions of the housing (52) are fitted with rubber boots (54, 56) to protect the ball joints (32) from the environment that are connected by the air passageway (22) and longitudinal grooves (34). The extended air passageway (22) allows the boots (54, 56) to communicate with one another to maintain pressure equilibrium so that neither boot collapses or is subjected to excessive expansion.

10 Claims, 2 Drawing Sheets

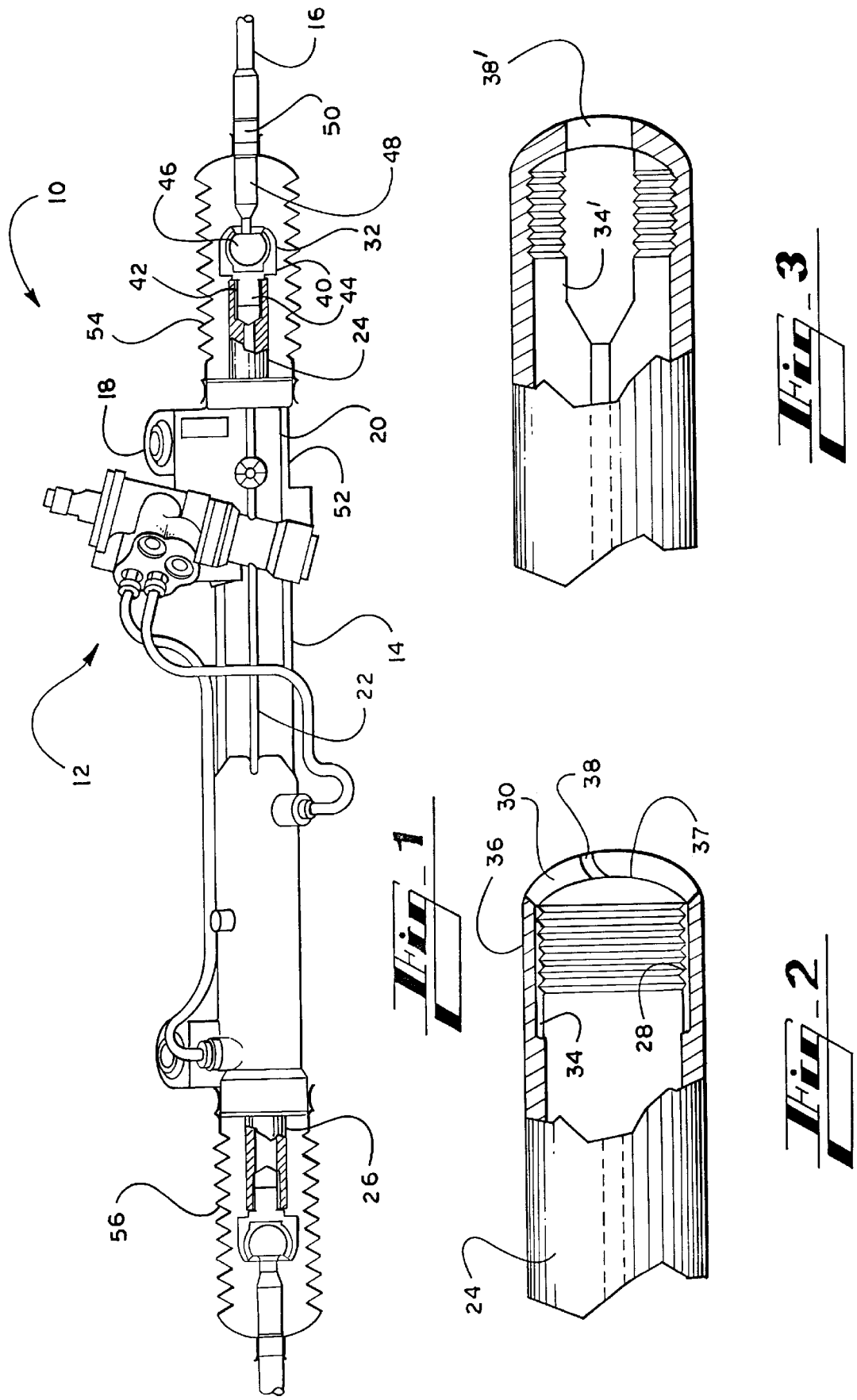

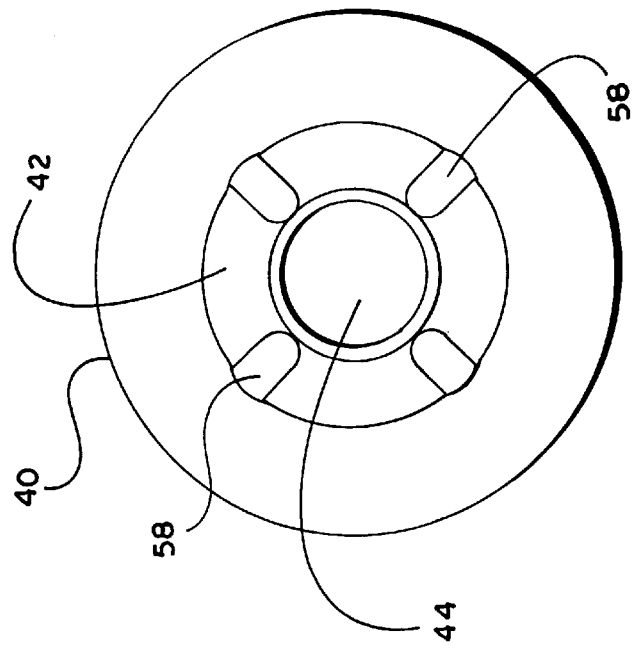
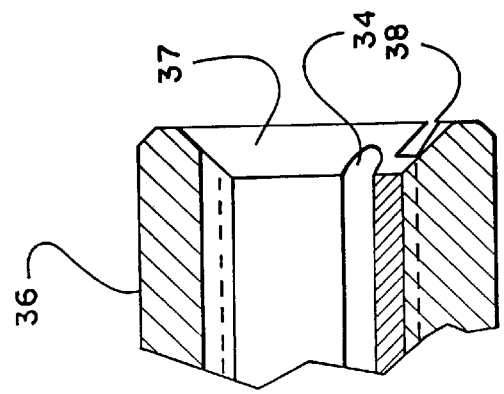
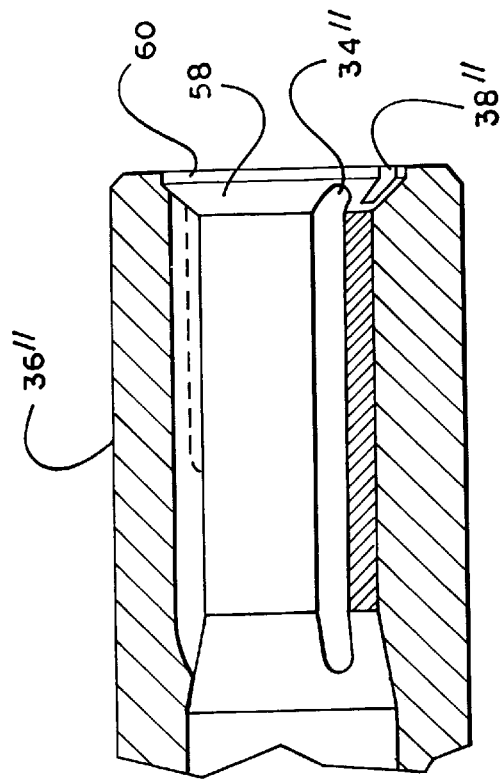
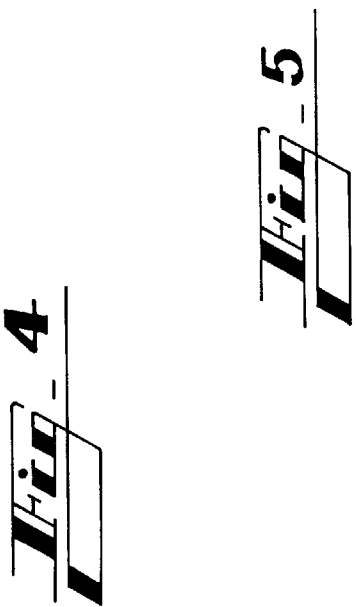

HOLLOW STEERING GEAR RACK WITH INTEGRAL AIR GROOVES

FIELD OF THE INVENTION

This invention relates generally to vehicle steering systems, and, more particularly, to a steering rack with boot covered ball joints connecting the steering rack and front wheels of the vehicle.

BACKGROUND OF THE INVENTION

A vehicle steering system contains a steering gear assembly that moves a steering rack linearly. The rack is connected by ball joints and tie rods to the front wheels of the vehicle. Each ball joint is protected from the environment by a rubber boot. As the driver turns the steering wheel, the steering gear assembly moves the rack in one direction or the other to effect a turn. This movement causes one boot to compress and the other boot to expand. This expansion and compression causes air pressure changes inside the rubber boots, potentially causing excessive expansion or collapse of a boot. Excessive expansion or compression causes premature wear of the boots exposing the ball joints to the environment. To protect against excessive expansion and compression, the boots have heretofore been connected by a breather tube extending between the boots. Naturally, the transfer of air between the boots allows pressure to remain equalized thereby preventing collapse or excessive expansion. While the breather tube works, it requires assembly, provides potential leakage points, and complicates packaging.

With a hollow rack, conventional approaches use either separate holes cross-drilled through the rack outer diameter or a system of cross-drilled holes in the ball joint housing to serve as connector passageways to the hollow rack to manage the air flow between the boots. These cross-drilled holes increase design and manufacturing complexity, and can also weaken the ball joint socket housing. Accordingly, it will be appreciated that it would be highly desirable to connect the boots without cross-drilling the rack or ball joints, increasing leakage points, and without complicating design, manufacturing or packaging.

SUMMARY OF THE INVENTION

The present invention is directed to overcoming one or more of the problems set forth above. Briefly summarized, according to one aspect of the present invention, a steering gear rack for a steering system of a vehicle comprises a housing having first and second end portions and an outer surface extending between the end portions and a hollow rack shaft positioned in the housing. The hollow rack shaft has first and second end portions and defines an air passageway that extends between the end portions. Each of the end portions has an end face and internal threads on the end portion extending inward from the end face, and a longitudinal groove extending inward from the end face past the internal threads and radially outward past the internal threads extending the air passageway to the end face.

The end portions of the housing are fitted with rubber boots that are connected by the air passageway and longitudinal grooves. The extended air passageway allows the boots to communicate with one another to maintain pressure equilibrium so that neither boots collapses or is subjected to excessive expansion.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 a diagrammatic view of a preferred embodiment of a steering system with a steering rack and ball joints protected by rubber boots connected by an internal air passageway according to the present invention.

FIG. 2 is somewhat enlarged view of one end of the steering rack of FIG. 1 with a section cut away to reveal the internal threads and longitudinal groove.

FIG. 3 is a somewhat enlarged view similar to FIG. 1 exaggerating the internal groove and illustrating another preferred embodiment.

FIG. 4 is a partial sectional view similar to FIGS. 2 and 3 but illustrating another preferred embodiment.

FIG. 5 is a somewhat enlarged sectional view of the end portion of the steering rack of FIG. 2 illustrating the counterbore in the end face.

FIG. 6 is an end view of one of the ball joint housing sockets illustrating radial grooves formed in the socket face.

DETAILED DESCRIPTION OF THE PREFERRED EMBODIMENTS

Referring to FIGS. 1, 2, 5 and 6, a vehicle 10 contains a steering system 12 that includes a steering gear rack assembly 14 connected on either end by a tie rod assembly 16 to a front wheel of the vehicle. A steering wheel is coupled to a steering gear assembly 18 to steer the vehicle. The steering gear rack assembly 14 includes a shaft 20 that physically moves when the steering wheel is turned to maneuver the vehicle and causes the front wheels to turn. The shaft 20 has an air passageway 22 extending longitudinally through it from one end portion 24 to its other end portion 26. End portions 24, 26 are essentially mirror images of each other. The right end portion 24 will be described in detail and the left end portion 26 described as needed.

The first end portion 24 of the shaft 20 has an opening of larger diameter than the air passageway 22 and has internal threads 28 running from an end face 30 of the first end portion 24 inwardly toward the second end portion 26 a distance sufficient forming a proper mechanical connection with ball joint 32. The opening in the first end portion 24 is coextensive with the air passageway 22 and extends the air passageway to the end face 30. First end portion 24 also defines a longitudinally extending groove 34 that extends from end face 30 inward toward the second end portion 26 past the internal threads 28 to also extend the air passageway 22 to end face 30. Groove 34 is formed deeper than internal threads 28 so that groove 34 extends radially outward past the threads 28 and comes closer to the outer surface 36 of the first end portion 24 than the threads 28. By this construction the groove 34 extends the air passageway 22 even when threads 28 engage ball joint 32.

End face 30 contains a radially extending groove 38 and counterbore 37 that allows air to flow from air passageway 22 to counterbore 37 and across end face 30 to the outside of first end portion 24. Counterbore 37 extends from the end face 30 inward towards threads 28 so that it narrows as it progresses inward. Radial groove 38 may be located at any position about the circumference of end face 30, or radial groove 38' may be aligned with the longitudinal groove 32' as shown in FIG. 3. In FIG. 3 the end portion is rotated 90° to look in at longitudinal groove 34' which has its width exaggerated to illustrate the taper. Alternatively, end face 30 may contain a radial groove 38" and a counterbore 58 and recess 60 that allow air to flow from air passageway 22 to counterbore 58 and recess 60 and across end face 30 to the outside of first end portion 24 (FIG. 4). Recess 60 extends from the end face inward a short distance parallel to the axis of the shaft and ends. Counterbore 58 begins where the recess 60 ends and extends inward toward the threads so that it narrows as it progresses inward.

Referring to FIGS. 1 and 6, the ball joint 32 has a socket portion 40 with a socket face 42 and an externally threaded member 44 extending from socket face 42 engaging internal threads 28 of first end portion 24. Radial groove 38 constitutes an air passageway that cannot be blocked by socket face 42. The socket face 42 may also have a plurality of radially extending grooves 58 to direct air from the extended air passageway to the outside when the socket face 42 and end face 30 abut one another. Radial groove 38 need not be aligned with or coextensive with longitudinal groove 34 to function effectively. Because threads 28 engage threaded socket member 44, it is important that the longitudinal grove 24 be formed deeper than the threads to keep the air passageway open.

The joint 32 includes a ball 46 mated with socket 40 and a threaded connecting member 48 extending outward from the ball 46 and socket 40. Preferably, the connecting member 48 is externally threaded and mates with an internally threaded connecting sleeve 50 which is connected to the tie rod assembly 16.

A housing 52 has first and second end portions. The shaft 20 is contained within the housing 52 with its end portions 24, 26 respectively protruding from the first and second end portions of the housing 52. A first boot 54 sealing engages the first end portion of housing 52 and also sealing engages connecting sleeve 50 thereby enclosing ball joint 32 to protect it from the environment. The boot 54 forms an air chamber about joint 32 that communicates with air passageway 22 through longitudinal groove 34 and radial groove 38. A second boot 56 is similarly connected to the second end of housing 54 and communicates with boot 54 through the air passageway and grooves so that pressure equilibrium can be maintained. As is known in the art, the boots are constructed of rubber or elastomeric material with accordion folds to accommodate expansion and compression and turns.

The air passages in and through the rack are communicated from the hollow shaft end face into the boot cavity via radial grooves fabricated across the end face of the hollow shaft at the interface with the ball socket housing. Alternatively, the air is communicated from the shaft passages past the ball socket to the boot cavities via machine cut or alternately formed grooves in the abutment end face of the ball socket housing.

During operation, as the driver turns the steering wheel to the left, for example, the steering gear assembly moves the rack to the left to effect the turn. This movement causes the left boot to compress and the right boot to expand. This expansion and compression causes air pressure changes inside the rubber boots, but because the boots are connected by the air passageway, longitudinal grooves and radial grooves, air transfers from the left boot to the right boot to maintain pressure equilibrium thereby preventing excessive expansion of the left boot or collapse of the right boot. When a right turn is made, the right boot compresses and the left boot expands. Excessive expansion or compression could cause premature wear of the boots exposing the ball joints to the environment, but the extended air passageway allows air transfer between the boots to protect against excessive expansion and compression.

While the invention has been described with particular reference to the preferred embodiments, it will be understood by those skilled in the art that various changes may be made and equivalents may be substituted for elements of the preferred embodiments without departing from invention. It is accordingly intended that the claims shall cover all such modifications and applications as do not depart from the true spirit and scope of the invention.

What is claimed is:

1. A steering gear rack system for a steering system of a vehicle, comprising:

a housing having first and second end portions and an outer surface extending between said housing end portions; and a hollow rack shaft having a longitudinal axis and being positioned in said housing, said rack shaft having first and second end portions and defining an air passageway extending axially between said first and second end portions of said rack shaft, each of said rack shaft end portions having an end face and internal threads extending axially inward from said end face, each of said rack shaft end portions having a longitudinal groove extending axially inward from said end face past said internal threads and radially outward past said internal threads thereby extending said air passageway to said end face, said end face defining a radially extending groove extending the air passageway from said longitudinal groove.

2. A steering gear rack system, as set forth in claim 1, including:

a first joint having a socket portion with an externally threaded member mateable with said internal threads of said first end portion of said rack shaft and a socket face facing said end face of said first end portion of said rack shaft, said first joint having a ball portion with a ball mateable with said socket and having a threaded connecting member; and a first boot fastened about said first end portion of said housing and said connecting member of said ball portion of said joint forming an air chamber in communication with said air passageway through said longitudinal groove of said first end portion of said shaft.

3. A steering gear rack system, as set forth in claim 2, wherein said socket face seats against said end face.

4. A steering gear rack system, as set forth in claim 2, wherein said boot forms a housing for said joint.

5. A steering gear rack system, as set forth in claim 2, including:

a second joint having a socket portion with an externally threaded member mateable with said internal threads of said second end portion of said shaft and a socket face facing said end face of said second end portion of said shaft, said second joint having a ball portion with a ball mateable with said socket and a threaded connecting member; and a second boot fastened about said second end portion of said housing and said connecting member of said ball portion of said joint forming an air chamber in communication with said air passageway through said longitudinal groove of said second end portion of said shaft, said boots communicating with one another through said air passageway and longitudinal grooves to maintain pressure equilibrium in said boots.

6. A steering gear rack system, as set forth in claim 1, wherein said grooves intersect one another providing a continuous air passageway.

7. A steering gear rack system, as set forth in claim 1, wherein said first end portion of said rack shaft defines a counterbore extending axially inward from said end face of said rack shaft first end portion toward said second end portion of said housing, said counterbore intersecting said axial and radial grooves providing a continuous air passageway from said longitudinal groove to said radial groove.

8. A steering gear rack system, as set forth in claim 1, wherein said first end portion of said rack shaft defines a recess and a counterbore, said recess extending axially inward from said end face of said rack shaft first end portion a preselected distance toward said second end portion of said housing, said counterbore extending radially inward as it progresses from said recess toward said internal threads so that it narrows as it progresses inward, said counterbore extending axially inward from said recess toward said internal threads, said recess intersecting said radial grooves and said counterbore intersecting said longitudinal groove providing a continuous air passageway from said longitudinal groove to said radial groove.

9. A steering gear rack system, as set forth in claim 1, wherein said longitudinal groove tapers after passing said internal threads.

10. A steering gear rack system for a steering system of a vehicle, comprising:

a hollow rack shaft having a longitudinal axis, a bore extending along said axis, and first and second end portions, said rack shaft defining an air passageway extending axially between said first and second end portions, each of said rack shaft end portions having an end face and internal threads extending axially inward from said end face, each of said rack shaft end portions having a longitudinal groove extending axially inward from said end face past said internal threads and radially outward past said internal threads thereby extending said air passageway to said end face, said end face defining a counterbore and a radially extending groove, said counterbore extending the air passageway from said longitudinal groove to said radial groove.

* * * * *